United States Patent

[11] 3,617,095

| [72] | Inventor | Kenneth J. Lissant<br>Saint Louis, Mo. |
|---|---|---|
| [21] | Appl. No. | 676,047 |
| [22] | Filed | Oct. 18, 1967 |
| [45] | Patented | Nov. 2, 1971 |
| [73] | Assignee | Petrolite Corporation<br>Wilmington, Del. |

[54] METHOD OF TRANSPORTING BULK SOLIDS
7 Claims, No Drawings

[52] U.S. Cl. ..................................... 302/66,
44/51, 252/8.55 R, 252/309, 252/312
[51] Int. Cl. ......................................... B65g 53/04
[50] Field of Search ........................... 214/51;
252/8.55 A, 309, 312; 44/7; 302/66

[56] References Cited
UNITED STATES PATENTS

| 2,742,426 | 4/1956 | Brainerd .................. | 252/8.55 A |
| 2,920,948 | 1/1960 | Weeks ..................... | 44/51 |
| 2,927,849 | 3/1960 | Greblick .................. | 44/51 |
| 3,212,866 | 10/1965 | McCoy et al. ........... | 44/51 |
| 3,432,209 | 3/1969 | Scott ....................... | 44/51 |
| 3,341,256 | 9/1967 | Adams ..................... | 44/51 |

*Primary Examiner*—Daniel E. Wyman
*Assistant Examiner*—Mrs. Y. H. Smith
*Attorney*—Sidney B. Ring ABSTRACT: A process of transporting bulk solids such as bulk chemicals, grains, coal, ores, etc. through enclosed channels or ducts, such as pipes or pipelines, which is characterized by moving, such as by pumping, insoluble bulk solids suspended in a pseudo-plastic fluid exhibiting non-Newtonian viscosity properties, as exemplified by thixotropic emulsions, through such enclosed channels.

METHOD OF TRANSPORTING BULK SOLIDS

This invention relates to a process of transporting bulk solids such as bulk chemicals, grains, coal, ores, etc. through enclosed channels or ducts, such as pipes or pipelines, which is characterized by moving insoluble bulk solids suspended in non-Newtonian fluids, as exemplified by thixotropic emulsions, through such enclosed channels.

The transport of bulk liquid materials through channels, ducts, or pipelines is of great antiquity; for example, water for irrigation purposes has been transported in aqueducts and similar structures for thousands of years. Among the advantages of such means of transport are mechanical simplicity, immunity from contamination and weather conditions, and large capacity. A further advantage is the elimination of laborious loading and unloading at each end of the transport system. Because of these obvious advantages numerous attempts have been made to apply the same method of transport to the transportation of bulk solids, such as bulk chemicals, grains, coal, minerals, ores, etc.

Within recent years several serious attempts have been made to pump bulk solids such as coal through pipelines in the form of a slurry. Bulk solids have also been transported for short distances by "fluidizing" the solids in a gas stream.

Both the fluidizing and slurry methods of transportation suffer from the limitations that the material must be placed in a finely divided state, and the fluid slurry stream must be pumped at sufficient rates of speed to maintain the solids in suspension since, if the transport system is stopped at any time, the solid materials settle out and are difficult to resuspend.

I have now found that such limitations can be avoided by using a non-Newtonian fluid as a transporting medium.

I have now devised a method for transporting bulk solids such as bulk chemicals, grains, coal, minerals, etc., through enclosed channels or ducts such as pipes or pipelines which is characterized by transporting, such as by pumping, insoluble bulk solids suspended in a pseudo-plastic or thixotropic fluid exhibiting non-Newtonian viscosity properties through such enclosed channels or pipes. By "non-Newtonian" I mean a fluid of thixotropic or pseudo-plastic character. By definition, these fluids possess the property of exhibiting variable apparent viscosity when the shear rate is varied. Stated another way, when these fluids are pumped at low shear rates, they behave as though they are extremely viscous fluids; but as the pumping rate is increased and concomitantly the shear rate increases, the fluids appear to "shear thin" and then behave as though they have low viscosities. I have found that fluids of such a character, when flowing at a good linear viscosity exhibit a low enough effective viscosity to entrain and transport bulk solids and at the same time to afford easy pumping characteristics. However, the same fluids, when the lineal velocity is reduced or are at rest, appear to increase in viscosity and therefore retain the bulk solids in suspension instead of allowing them to settle as occurs in the case of Newtonian fluids.

For the purposes of this invention, any thixotropic or pseudo-plastic fluid with suitable pumping characteristics which can suspend bulk fluids can be advantageously employed. Among such fluids are polymer solutions, gels and emulsions.

I have particularly found, however, that the use of emulsions, and specifically high-internal-phase-ratio emulsions, i.e., where the internal phase is a major part of the emulsion, are particularly well suited for this purpose, since from an economic standpoint, large volumes of emulsion may be formulated with inexpensive major constituents thereby providing inexpensive fluids.

Previous methods of transport employed either high velocity gas streams or Newtonian fluids such as water, oil and the like. Such fluids are characterized by the fact that their effective viscosity does not vary with rate of shear imposed upon the fluid. The non-Newtonian fluids employed in the practice of this invention, however, are characterized by the fact that when at rest or under low shear conditions they behave like elastic solids or extremely viscous liquids; but when subjected to moderate shear rates, such as are encountered in pumping through pipes at practical, but not extremely rapid rates, the fluids behave as though they were low viscosity media.

In employing non-Newtonian fluids in the transport of solid materials I have found that such fluids entrain and retain in suspension substantial amounts of solids. I have further found that these materials under pumping conditions exhibit a low effective viscosity, and can therefore be pumped without the expenditure of excessive power. However, when pumping is stopped for any reason, the fluids regain their elastic solid structure which prevents the settling or deposition of the solid material in the pipeline. I have also found that it is not necessary to limit this method of transport to finely divided solids, since the non-Newtonian fluids employed in this invention are capable of entraining, transporting and holding in suspension both large as well as small particles.

Thus, the emulsions employed in the process are high-internal-phase-ratio emulsions. These high-internal-phase-ratio emulsions are pseudo-plastic fluids; that is, rather than exhibiting Newtonian viscosity properties, the apparent viscosity of the formulation is a function of the rate of shear. Simply stated, these fluids behave like elastic solids when at rest or when subjected to forces below their yield point. Above their yield point they begin to flow, and at normal pumping velocities their viscosity is close to the viscosity of the external phase employed. I have found that such emulsions, when pumped through a pipeline, can inexpensively and effectively transport bulk solids. The efficiency of the process is further enhanced by the fact that high lineal velocities are not required for the suspension of particulate matter, since the apparent viscosity increases with a decrease in shear rates thus preventing resettling of suspended bulk solids. Because these emulsions can be prepared with either an oily or a water or nonoily type external phase, they can be appropriately selected so as to be noncorrosive or noncontaminating to the particular piping system and can be quickly and efficiently flushed from the system by the use of fluids of the same type as the external phase. These emulsions contain an internal phase which is the major part of the emulsions; for example, at least about 60 percent, such as at least about 80 percent, but preferably in excess of about 90 percent, by volume.

High internal phase emulsions which can be employed in this invention are those disclosed in the following patent applications:

| Serial No. | Filed | Title | Related application and other comments |
|---|---|---|---|
| 286,877 | May 20, 1963 | Stable emulsions | Now abandoned. |
| 302,177 | Aug. 14, 1963 | Hybrid fuels I | Now abandoned. |
| 411,103 | Nov. 13, 1964 | Emulsions preparation. | Now abandoned. |
| 541,738 | Apr. 11, 1966 | Method of resolving thixotropic jet and rocket emulsions. | U.S. Pat. No. 3,378,418 granted on Apr. 16, 1968. |
| 547,581 | May 4, 1966 | Hybrid fuels I | Continuation of S.N. 302,177 and now U.S. Pat. No. 3,352,109 granted on Nov. 14, 1967. |
| 565,702 | July 18, 1966 | Improved thixotropic emulsions. | Now Pat. No. 3,490,237. |
| 599,332 | Oct. 19, 1966 | Stable emulsions | Continuation-in-part of S.N. 286,877 and now abandoned. |
| 637,332 | May 10, 1967 | Essentially nonaqueous emulsions. | |

The thixotropic emulsions of this invention, which have the characteristics of solids at rest and liquids when force is exerted on them, have the following advantages:

1. Nonadhesive—They do not tend to stick to the sides of the container or piping system.
2. Viscosity—The apparent rest viscosity is greater than 1,000 c.p.s., generally in the range of 10,000–100,000 or greater, preferably 50,000–100,000 c.p.s., or more. However, under low shear, they will flow with a viscosity approaching that of the liquid phases. On removal of shear, the recovery to original apparent rest viscosity is nearly instantaneous. The hysteresis loop is very small.

3. Temperature Stability—Increased temperature has little effect on viscosity until the critical stability temperature is reached at which point the emulsion breaks into its liquid components. This permits a wide temperature range of operation.
4. Shear Stability—Emulsions may be subjected repeatedly to shear without degradation so long as the critical shear point is not reached. At this point the emulsion breaks. However, the critical shear point is sufficiently high to permit pumping at high rates.
5. Quality Control—With these emulsions it is easy to reproduce batches with identical properties due to the absence of any "gel" structure.
6. Solids Content—Emulsions will flow well even with high solids content since they have a broad range between rest viscosity and viscosity under modest shear.

In contrast to very high volume percent solid loading in gels or slurries which result in a "putty," these emulsions can suspend such solids in the internal phase while allowing the external phase to govern "flowability."

The above patent applications, which are by reference incorporated into the present application, relate to stable, viscous thixotropic emulsions and to the uses, preparation, etc., of these emulsions.

Whether an oil external or an aqueous external phase is employed in preparing these emulsions will depend on the particular system in which it is employed. For example, since water is less expensive than oily solvents, it can be used to make up the bulk of the emulsion while the oily external phase will contact the pipe surface thus reducing the corrosive effect of an aqueous system. To further reduce the possibility of corrosion, a corrosion inhibitor may be employed.

Thus, the emulsions employed in this invention include:
1. Oil-in-water emulsions
2. Water-in-oil emulsions
3. The above emulsions of (1) and (2) where waterlike substances are employed in place of water as described in Ser. No. 637,332 filed May 10, 1967, now U.S. Pat. No. 3,539,406.
4. The above emulsions where auxiliary additives such as antifreeze compounds, corrosion inhibitors, biocides, etc. are employed in either or both phases as described in Ser. No. 565,702, filed July 18, 1966 and now U.S. Pat. No. 3,490,237.
5. Emulsions prepared by a continuous method, as described in Ser. No. 411,103, filed Nov. 13, 1964, now abandoned. Thus, any of the oily and nonoily materials, emulsifiers and techniques, etc. described in the above applications can be employed in preparing the emulsions of this invention.

Since these emulsions have been described in such great detail in the above applications, repetition herein is unnecessary.

The following examples are presented for purposes of illustration and not of limitation. Oxyalkylations were carried out by the general procedure described in U.S. Pat. No. 2,572,886, example 1a, columns 9 and 10.

EMULSIFIER A

An emulsifier was prepared by oxyalkylating 1,3-butanediol with 3.0 parts by weight of butylene oxide, 32.2 parts of propylene oxide and 16.6 parts of ethylene oxide in the order given.

EMULSIFIER B

An emulsifier was prepared by oxyalkylating triethyleneglycol with 5.1 parts by weight of butylene oxide, 30.0 parts of propylene oxide and 22 parts of ethylene oxide in the order given.

EMULSIFIER C

An emulsifier was prepared by oxyalkylating octyl phenol with 0.69 parts by weight of ethylene oxide.

In addition nonoxyalkylated emulsifiers can also be employed.

The following example illustrates the preparation of a thixotropic water external-oil high internal phase emulsion.

EXAMPLE 1

Three quarts of water and 150 ml. of Emulsifier A were thoroughly mixed. One gallon of kerosene was then added and mixed into this material until a smooth emulsion was formed. This premix was then placed into a 20 gallon open mixing vessel, equipped with an anchor type stirrer. With the stirrer revolving at about 200 r.p.m., additional kerosene was added until a total of 10 gallons of kerosene had been mixed in. The result was a white, highly thixotropic, oil-in-water emulsion.

The following example illustrates the preparation of a thixotropic water external-oil high internal phase emulsion.

EXAMPLE 2

A two inch diameter, Viking pump, driven by an electric motor at 805 r.p.m., was equipped with an eight foot flexible hose on the outlet and a similar flexible hose on the inlet. The ends of the two hoses were placed in a 50 gallon, open head, steel drum. With this arrangement, material could be pumped out of the drum, through the pump, and back into the drum.

One gallon of water and one pint of Emulsifier B were mixed together and placed in the steel drum. While this material was circulated by the pump, mineral spirits was slowly added to the intake of the pump. In about 15 minutes, 50 gallons of mineral spirits had been added and the result was a thick, white, jellylike emulsion.

The following example illustrates the preparation of an oil external-high internal water phase thixotropic emulsion.

EXAMPLE 3

A two inch diameter, Viking pump, driven by an electric motor at 850 r.p.m., was equipped with an eight foot flexible hose on the outlet and a similar flexible hose on the inlet. The ends of the two hoses were placed in a 50 gallon, open head, steel drum. With this arrangement, material could be pumped out of the drum, through the pump, and back into the drum.

One gallon of kerosene and one pint of emulsifier C were mixed together and placed in the steel drum. While this material was circulated by the pump, mineral spirits was slowly added to the intake of the pump. In about 15 minutes, 50 gallons of water had been added and the result was a thick, white, jellylike emulsion.

The following are illustrations of bulk solids which may be transported according to this invention.
1. Coal
2. Ores such as copper, lead, zinc, nickel, iron, asbestos, uranium, etc., ores, diamond-bearing gravel, etc.
3. Shale
4. Sulfur
5. Chemicals-potash, etc.
6. Wood
7. Grain
8. Solid packed in capsules or containers in which the bulk solid are "containerized" and then transported in the non-Newtonian fluid.

When the bulk solids arrive at their destination, they can be removed by any desirable means, for example such as by direct filtration of the emulsion, demulsification, demulsification followed by filtration, settling, etc.

EXAMPLES

A piping circuit was constructed and a thixotropic emulsion of the type described in the examples indicated was introduced into the system. This emulsion was pumped without undue difficulty.

A variety of bulk solids were introduced into the piping system which were entrained, suspended and transported throughout the system without difficulty. When the pumping rate was reduced or stopped, even for extended periods of time, the entrained bulk solids remained suspended in the emulsion and pumping was resumed at any time regardless of the duration of the interruption.

Among the materials which have been successfully suspended and transported in such systems are:
1. Powdered coal
2. Lump stoker coal
3. Pea gravel
4. Iron oxide
5. Solid granular and powdered sulfur
6. Barite
7. Metallic powdered aluminum
8. Mill scale and slag granules
9. Sand The following are typical illustrative examples.

TABLE I

| Ex. | Emulsion Ex. | Type bulk solids | Average particle size | Loading percent solids by volume in emulsion | Comment |
|---|---|---|---|---|---|
| 1 | 3 | Silica Sand | 20 mesh | 40 | Retrieved by filtration of emulsion. |
| 2 | 3 | Pea gravel | ⅛-½ in. | 20 | Do. |
| 3 | 1 | Metallic aluminum. | 200 mesh | 43 | Retrieved by breaking emulsion and settling. |
| 4 | 1 | Sulfur | 40 mesh and greater. | 20 50 | |
| 5 | 3 | Barite | 100 mesh | 55 | |
| 6 | 3 | Mill scale and slag. | 100 mesh to ½ in. lumps. | 20-40 | Retrieved by filtration of emulsion. |

Bulk solids having particles sizes of from very small to very large can be transported, for example from about 500 mesh or less to about two inches or more, such as about 400 mesh to about 1.5 inch, for example about 200 mesh to about one inch, but preferably about 40 mesh to about 0.5 inch. The optimum size will depend on the particular system.

Loading of up to about 75 percent or greater by volume may be employed such as up to about 60 percent, but preferably up to about 40–50 percent. The optimum loading will depend on the particular system.

In addition, other suitable thixotropic or pseudo-plastic materials other than emulsions which exhibit non-Newtonian viscosities may also be employed.

As is quite evident, a wide variety of thixotropic emulsions are useful in this invention. It is, therefore, not only impossible to attempt a comprehensive catalogue of such compositions, but to attempt to describe the invention in its broadest aspects in terms of specific chemical names for the components of such emulsions would be too voluminous and unnecessary since one skilled in the art could by following the description of the invention herein prepare an appropriate emulsion. This invention encompasses the use of thixotropic and other pseudo plastic fluids in transporting bulk solids and the individual components of such fluids are important only in the sense that they affect this function. To precisely define each specific useful phase of the emulsion and emulsifier in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability of specific phases of the emulsions and emulsifiers suitable for this invention by applying them in the process set forth herein. In analogy to the case of a machine, wherein the use of certain materials of construction or dimensions of parts would lead to no practical useful result, various materials will be rejected as inapplicable where others would be operative. I can obviously assume that no one will wish to use a useless emulsion nor will be misled because it is possible to misapply the teachings of the present disclosure to do so. Thus, any thixotropic emulsion that can perform the function started herein can be employed. Analogously other thixotropic or pseudoplastic fluids besides emulsions can be employed.

Having thus described my invention what I claim as new and desire to obtain by Letters Patent is

1. A process for transporting insoluble bulk solids through an enclosed channel comprising moving said insoluble bulk solids through said enclosed channel while said insoluble bulk solids are suspended in a thixotropic emulsion having a high volume ratio of internal phase to external phase, the emulsion having an emulsifying agent, an emulsifiable oil and a nonoil, the emulsion being an oil-in-nonoil or a nonoil-in-oil emulsion, the internal phase of said thixotropic emulsion being present in said emulsion in an amount of at least 80 percent by volume of the emulsion, said emulsion having the characteristics of a liquid when a force is exerted on it, said emulsion tending to be nonadhesive, said emulsion having a critical shear point sufficient to permit pumping at high rates, and said emulsion having an apparent rest viscosity greater than about 1,000 c.p.s.

2. The process of claim 1 wherein said thixotropic emulsion is a nonoil external-oil high internal phase emulsion.

3. The process of claim 1 wherein said thixotropic emulsion is a water-in-oil emulsion.

4. The process of claim 2 wherein said thixotropic emulsion is an oil-in-water emulsion.

5. The process of claim 1 wherein said thixotropic emulsion contains an auxiliary additive selected from the group consisting of corrosion inhibitor additives, antifreeze additives, biocidal protective additives, antiknock compositions, anti-icing compositions, antioxidant compositions, lubricating additives, multipurpose additives having at least two of the properties of said respective additives and compositions, and mixtures of at least two of said additives and compositions.

6. The process of claim 3 wherein said thixotropic emulsion is a water-in-hydrocarbon emulsion.

7. The process of claim 4 wherein said thixotropic emulsion is a hydrocarbon-in-water emulsion.

* * * * *